United States Patent
Kato et al.

(10) Patent No.: US 9,537,294 B2
(45) Date of Patent: Jan. 3, 2017

(54) INTEGRATED SHIELDING PROTECTOR AND WIRE HARNESS

(75) Inventors: Takashi Kato, Makinohara (JP); Tatsuya Oga, Kosai (JP)

(73) Assignee: YAZAKI CORPORATION, Tokyo (JP)

(*) Notice: Subject to any disclaimer, the term of this patent is extended or adjusted under 35 U.S.C. 154(b) by 428 days.

(21) Appl. No.: 13/805,125

(22) PCT Filed: Jun. 15, 2011

(86) PCT No.: PCT/JP2011/063710
§ 371 (c)(1),
(2), (4) Date: Dec. 18, 2012

(87) PCT Pub. No.: WO2011/158868
PCT Pub. Date: Dec. 22, 2011

(65) Prior Publication Data
US 2013/0092434 A1     Apr. 18, 2013

(30) Foreign Application Priority Data
Jun. 18, 2010 (JP) .................... 2010-138911

(51) Int. Cl.
H02G 3/04       (2006.01)
B60R 16/02      (2006.01)

(52) U.S. Cl.
CPC ............ *H02G 3/04* (2013.01); *B60R 16/0215* (2013.01); *H02G 3/0406* (2013.01); *H02G 3/0487* (2013.01)

(58) Field of Classification Search
CPC .. H02G 3/0487; H02G 3/0462; H02G 3/0406; H02G 3/04
See application file for complete search history.

(56) References Cited

U.S. PATENT DOCUMENTS

| 4,972,041 A | * | 11/1990 | Crawley | H01B 7/0861 174/115 |
| 5,097,099 A | * | 3/1992 | Miller | H01B 7/0861 174/115 |

(Continued)

FOREIGN PATENT DOCUMENTS

| CN | 1667898 A | 9/2005 |
| CN | 101553885 A | 10/2009 |

(Continued)

OTHER PUBLICATIONS

Extended European Search Report, dated Oct. 24, 2013, issued by the European Patent Office in counterpart European Application No. 11795772.0.

(Continued)

*Primary Examiner* — Zachary M Pape
*Assistant Examiner* — Douglas Burtner
(74) *Attorney, Agent, or Firm* — Sughrue Mion, PLLC

(57) ABSTRACT

An integrated shielding protector and a wire harness are provided so that the man-hours concerning the wiring operation can be reduced, and the number of components also can be reduced. A conductive integrated shielding protector, including a first high voltage accommodating part, a second high voltage accommodating part and a low voltage accommodating part, is used when first high voltage wires the voltage of which is high, second high voltage wires the voltage of which is high but lower than that of the first high voltage wires, and low voltage wires the voltage of which is low are wired in parallel in the same course. A wire harness, including the integrated shielding protector, the first high voltage wires, the second high voltage wires and the low voltage wires, is wired inside a vehicle compartment.

13 Claims, 6 Drawing Sheets

(56) References Cited

U.S. PATENT DOCUMENTS

| | | | | |
|---|---|---|---|---|
| 5,171,938 A * | 12/1992 | Katsumata | ............... | H01B 7/08 174/105 SC |
| 5,250,127 A * | 10/1993 | Hara | ............... | H01B 7/385 156/247 |
| 5,760,341 A * | 6/1998 | Laske | ............... | H01B 7/0009 174/113 R |
| 5,821,467 A * | 10/1998 | O'Brien | ............... | H01B 7/40 174/117 AS |
| 6,304,626 B1 * | 10/2001 | Adachi | ............... | G01N 23/046 378/19 |
| 8,013,249 B2 | 9/2011 | Watanabe et al. | | |
| 2001/0035297 A1 * | 11/2001 | Tamai | ............... | H01B 7/0009 174/133 R |
| 2003/0137053 A1 * | 7/2003 | Okayama | ............... | H01L 21/76838 257/758 |
| 2005/0007718 A1 * | 1/2005 | Stevenson | ............... | A61N 1/3754 361/118 |
| 2005/0011687 A1 | 1/2005 | Yamaguchi et al. | | |
| 2005/0057320 A1 * | 3/2005 | Brandt | ............... | H02J 13/002 333/24 R |
| 2005/0121222 A1 * | 6/2005 | Lee | ............... | H01B 11/12 174/113 R |
| 2005/0162015 A1 * | 7/2005 | Yamaguchi | ............... | B60R 16/0215 307/10.1 |
| 2006/0027392 A1 * | 2/2006 | Victor | ............... | H01B 11/12 174/113 R |
| 2006/0096777 A1 * | 5/2006 | Glew | ............... | H01B 11/04 174/113 C |
| 2007/0102188 A1 * | 5/2007 | Glew | ............... | H01B 7/295 174/113 C |
| 2007/0175652 A1 * | 8/2007 | Narumi | ............... | H01B 7/0838 174/117 F |
| 2008/0315262 A1 * | 12/2008 | Kuriyama | ............... | H01L 27/14623 257/231 |
| 2009/0294149 A1 * | 12/2009 | Watanabe | ............... | H01B 7/16 174/102 R |
| 2010/0012831 A1 | 1/2010 | Vertes et al. | | |
| 2010/0045106 A1 * | 2/2010 | Oga | ............... | B60R 16/0215 307/10.1 |
| 2010/0051314 A1 | 3/2010 | Watanabe et al. | | |
| 2011/0009039 A1 * | 1/2011 | Balagani | ............... | B23D 61/185 451/533 |
| 2011/0088944 A1 * | 4/2011 | Ogue | ............... | B60R 16/0215 174/72 A |
| 2011/0127084 A1 | 6/2011 | Ichikawa et al. | | |
| 2011/0132638 A1 * | 6/2011 | Oga | ............... | H02G 3/0462 174/135 |
| 2011/0133548 A1 * | 6/2011 | Toyama | ............... | B60R 16/0215 307/9.1 |

FOREIGN PATENT DOCUMENTS

| | | | | |
|---|---|---|---|---|
| JP | | 1298605 A | | 12/1989 |
| JP | | 2003143734 A | | 5/2003 |
| JP | | 2004224156 A | | 8/2004 |
| JP | | 2005237071 A | | 9/2005 |
| JP | | 2005291261 A | * | 10/2005 |
| JP | | 201047033 A | | 3/2010 |
| WO | | 2008069208 A1 | | 6/2008 |
| WO | WO 2010148165 A2 | * | 12/2010 | ........... H01B 7/0861 |

OTHER PUBLICATIONS

Office Action, dated Aug. 9, 2013, issued by the Japanese Patent Office in counterpart Japanese Patent Application No. 2010-138911.
Communication issued on Dec. 31, 2014 by the State Intellectual Property Office of the People's Republic of China in related application No. 201180030129.1.
International Search Report dated Aug. 30, 2011 from the International Searching Authority in counterpart application No. PCT/JP2011/063710.
Written Opinion dated Aug. 30, 2011 from the International Searching Authority in counterpart application No. PCT/JP2011/063710.
Office Action dated Nov. 9, 2015 issued by the State Intellectual Property Office of P.R. China in counterpart Chinese Patent Application No. 201180030129.1.
Office Action dated Mar. 7, 2016, issued by the State Intellectual Property Office of P.R. China in counterpart Chinese Application No. 201180030129.1.
Communication dated Jun. 30, 2016 issued by Patent Office of the People's Republic of China in counterpart Chinese Application No. 201180030129.1.

* cited by examiner

INTEGRATED SHIELDING PROTECTOR AND WIRE HARNESS

TECHNICAL FIELD

The present invention relates to an integrated shielding protector and a wire harness provided with the integrated shielding protector.

BACKGROUND ART

A plurality of high voltage electric wires are used to electrically connect with a battery and a motor-inverter in an electric vehicle or a hybrid vehicle. For example, in the following patent document 1, while the middle part of a plurality of high voltage electric wires is wired below a vehicle floor, the two ends of the plurality of high voltage electric wires are wired in an engine room of a vehicle front part or at a vehicle rear part by penetrating a vehicle frame. The plurality of high voltage electric wires are respectively inserted in metal protective pipes covering the overall length.

CITATION LIST

Patent Literature

[PTL 1] Japan Patent Publication No. 2004-224156

SUMMARY OF INVENTION

Technical Problem

In the above-mentioned related technique, since it is necessary to perform fixing operations relative to a part below the vehicle floor or penetrating operations to the vehicle frame in order to wire the plurality of high voltage electric wires, it is known that the operability concerning the wiring is not good. If it is considered to wire inside a vehicle compartment without the penetrating operations, the following new problems will arise.

That is, since the plurality of high voltage electric wires in the above-mentioned prior art are high voltage (288V) electric wires for an electric vehicle or a hybrid vehicle, when the electric wires are wired inside the vehicle compartment, a new problem will arise that the influence of electromagnetic noise will appear on an 12V low voltage electric wire or a 42V high voltage electric wire which are wired around inside the same vehicle compartment. If the electric wires are wired inside the vehicle compartment, a new problem will arise that the influence of electromagnetic noise will appear on an electronic device or the like which is carried inside the same vehicle compartment.

It is considered to provide shielding members, as a measure to solve the above new problems, for the plurality of high voltage electric wires wired inside the vehicle compartment and the 42V or 12V electric wires which are wired near the high voltage electric wires. However, the measure which provides a shielding member for each of the electric wires will lead to a problem that the number of components will increase, and a problem that the man-hours related to the wiring operation will increase.

The present invention is made in view of the above-mentioned situation, and the object of the invention is to provide an integrated shielding protector and a wire harness so that the man-hours concerning the wiring operation can be reduced and the number of components also can be reduced.

Solution to Problem

The above object of the invention is achieved with the following compositions.

(1) An integrated shielding protector, arranged at a position where a first high voltage electrical pathway the voltage of which is high and at least one of a second high voltage electrical pathway the voltage of which is high but lower than that of the first high voltage electrical pathway and a low voltage electrical pathway the voltage of which is low are wired in parallel in the same course, formed of material having conductivity, and divided for each voltage level and formed to integrally have at least one of a second high voltage accommodating part which accommodates the second high voltage electrical pathway and a low voltage accommodating part which accommodates the low voltage electrical pathway, and a first high voltage accommodating part which accommodates the first high voltage electrical pathway.

According to the integrated shielding protector of the above composition (1), when the integrated shielding protector has the first high voltage accommodating part, the second high voltage accommodating part and the low voltage accommodating part, these accommodating parts are divided for each voltage level, and the integrated shielding protector has conductivity. Therefore, if the first high voltage electrical pathway, the second high voltage electrical pathway and the low voltage electrical pathway are accommodated in the first high voltage accommodating part, the second high voltage accommodating part and the low voltage accommodating part, it will become possible to demonstrate a shielding function with one component. That is, it becomes possible to keep the second high voltage electrical pathway and the low voltage electrical pathway from being influenced by the electromagnetic noise generated from the first high voltage electrical pathway, for example. According to the integrated shielding protector of the above composition (1), since the first high voltage electrical pathway, the second high voltage electrical pathway and the low voltage electrical pathway are accommodated by one component, it becomes possible to reduce the number of components and the operating man-hours.

Alternatively, according to the integrated shielding protector of the above composition (1), when the integrated shielding protector has the first high voltage accommodating part and the second high voltage accommodating part or the low voltage accommodating part, these accommodating parts are divided for each voltage level, and the integrated shielding protector has conductivity. Therefore, if the first high voltage electrical pathway and the second high voltage electrical pathway or the low voltage electrical pathway are accommodated in the first high voltage accommodating part and the second high voltage accommodating part or the low voltage accommodating part, it will become possible to demonstrate a shielding function with one component. That is, it becomes possible to keep the second high voltage electrical pathway or the low voltage electrical pathway from being influenced by the electromagnetic noise generated from the first high voltage electrical pathway, for example. According to the integrated shielding protector of the above composition (1), since the first high voltage electrical pathway and the second high voltage electrical pathway or the low voltage electrical pathway are accommodated by one component, it becomes possible to reduce the number of components and the operating man-hours.

Thus, an effect is achieved that an integrated shielding protector can be provided so that the man-hours concerning the wiring operation can be reduced, and the number of components also can be reduced.

(2) The integrated shielding protector according to the above (1), wherein as accommodating parts corresponding to a plurality of the first high voltage electrical pathways, a plurality of the first high voltage accommodating parts, the number of which corresponds to the number of the first high voltage electrical pathways, are formed in parallel.

According to the integrated shielding protector of the above composition (2), it will become possible to keep the plurality of first high voltage electrical pathways from being influenced by electromagnetic noise from each other.

Therefore, an effect is achieved that a shielding function can be demonstrated for each of the first high voltage electrical pathways. That is, an effect is achieved that the influence of electromagnetic noise between the first high voltage electrical pathways can be avoided.

(3) The integrated shielding protector according to the above (1) or (2), comprising a pair of divided shielding protectors and fixing members adapted to fix the pair of divided shielding protectors to be fitted together.

Therefore, an effect is achieved that one type of the integrated shielding protector which is simple in composition and easy to be assembled can be provided.

According to the integrated shielding protector of the above composition (3), the pair of divided shielding protectors are fitted together so that the first high voltage electrical pathway, and the second high voltage electrical pathway and/or the low voltage electrical pathway are held between, and then the pair of divided shielding protectors are fixed by fixing members. By performing these operations, the assembly related to the integrated shielding protector is completed. That is, the assembly is simply completed.

(4) A wire harness comprising the integrated shielding protector according to the above (1) or (2), and a first high voltage electrical pathway the voltage of which is high and at least one of a second high voltage electrical pathway the voltage of which is high but lower than that of the first high voltage electrical pathway and a low voltage electrical pathway the voltage of which is low, which are wired in parallel in the same course by the integrated shielding protector.

According to the wire harness of the above composition (4), the first high voltage electrical pathway, and the second high voltage electrical pathway and/or the low voltage electrical pathway are separated for each voltage level and paralleled. According to the wire harness of the above composition (4), since the integrated shielding protector is included in composition, it becomes possible to accommodate electric wires in the integrated shielding protector and to demonstrate a shielding function.

Thus, an effect is achieved that a wire harness can be provided so that the man-hours concerning the wiring operation can be reduced, and the number of components also can be reduced.

(5) A wire harness according to the above (4), further comprising conductive branch shielding protectors which are connected with the integrated shielding protector.

According to the wire harness of the above composition (5), it becomes possible to accommodate electric wires and to demonstrate a shielding function in a wide range besides the place where the first high voltage electrical pathway, and the second high voltage electrical pathway and/or the low voltage electrical pathway are wired in parallel in the same course.

Therefore, an effect is achieved that electric wires can be accommodated in a wide range. Further, an effect is achieved that a shielding function can be demonstrated in a wide range.

DESCRIPTION OF EMBODIMENTS

An integrated shielding protector and a wire harness related to one embodiment of the invention use a conductive integrated shielding protector which integrally has a first high voltage accommodating part, a second high voltage accommodating part and a low voltage accommodating part, when a first high voltage electrical pathway the voltage of which is high, a second high voltage electrical pathway the voltage of which is high but lower rather than that of the first high voltage electrical pathway, and a low voltage electrical pathway the voltage of which is low are wired in parallel in the same course. The wire harness which includes the integrated shielding protector, the first high voltage electrical pathway, the second high voltage electrical pathway and the low voltage electrical pathway in composition is wired inside a vehicle compartment.

Alternatively, when the first high voltage electrical pathway and one of the second high voltage electrical pathway and the low voltage electrical pathway are wired in parallel in the same course, the conductive integrated shielding protector which integrally has the first high voltage accommodating part and one of the second high voltage accommodating part and the low voltage accommodating part is used. The wire harness which includes the integrated shielding protector and the first high voltage electrical pathway etc. in composition is wired inside a vehicle compartment.

Embodiment 1

Figure 1A:
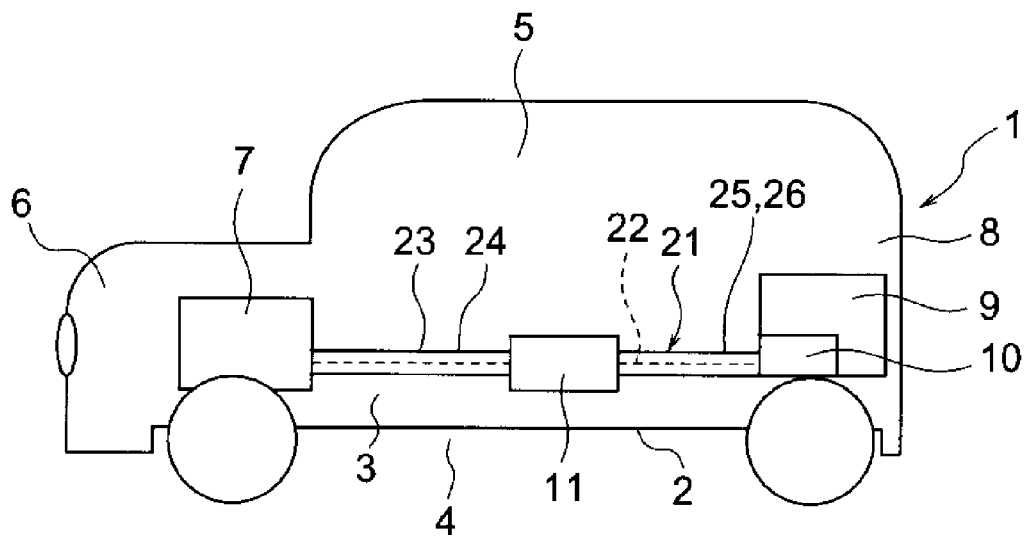
FIG. 1A is a vertical cross sectional view which is a schematic block diagram that shows a wiring course of a wire harness which contains an integrated shielding protector of one embodiment of the present invention in composition.
Figure 1B:
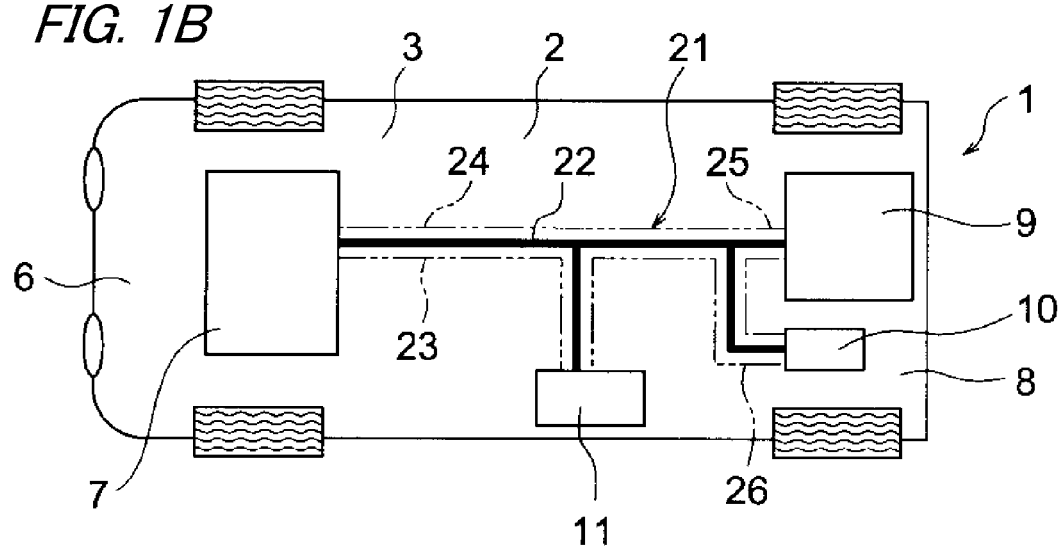
FIG. 1B is a horizontal sectional view of FIG. 1A.
Figure 2A:
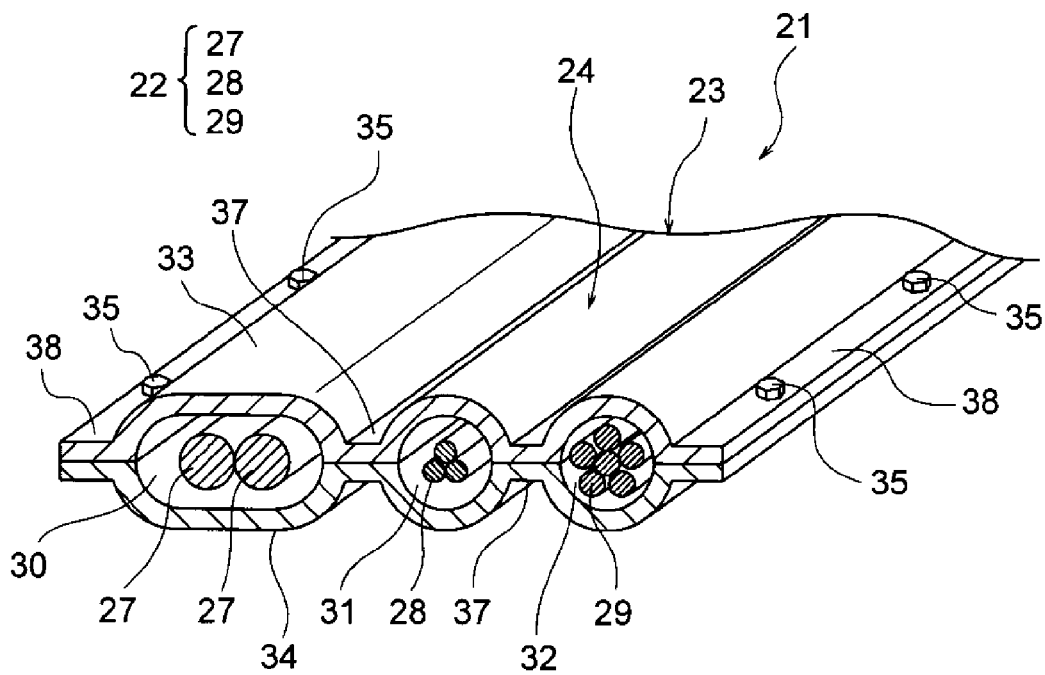
FIG. 2A is a perspective view which contains a part of a cross section of the wire harness.
Figure 2B:
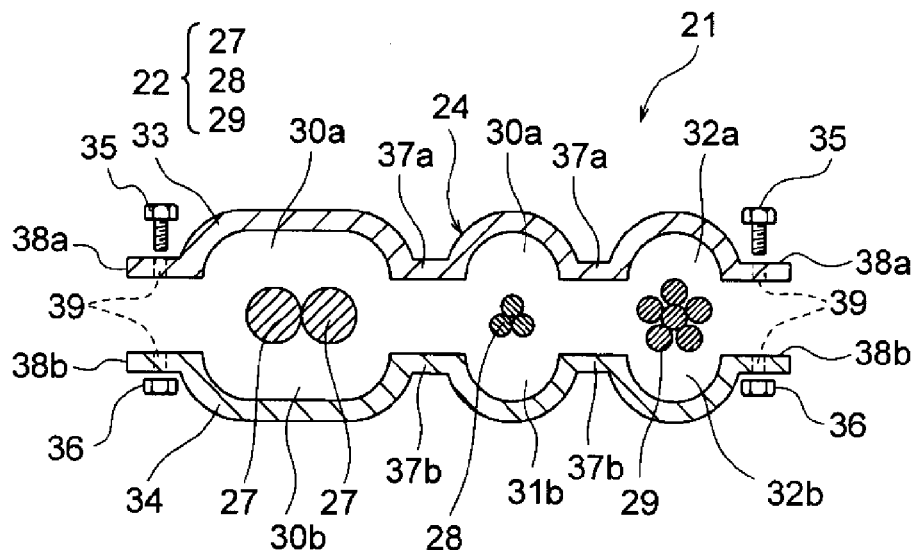
FIG. 2B is an exploded cross sectional view which shows the composition of the wire harness of FIG. 2A (an embodiment 1).

Next, an embodiment 1 is described with reference to the figures. FIGS. 1A and 1B are a vertical cross sectional view and a horizontal cross sectional view which are schematic block diagrams that show a wiring course of a wire harness which contains an integrated shielding protector of the embodiment of the present invention in composition. FIG. 2A is a perspective view which contains a part of a cross section of the wire harness, and FIG. 2B is an exploded cross sectional view which shows the composition of the wire harness of FIG. 2A.

In FIGS. 1A and 1B, a reference sign 1 shows a hybrid vehicle (or an electric vehicle). The hybrid vehicle 1 is a vehicle which is driven by mixing two powers of an engine and a motor, and the electric power from a battery will be supplied to the motor via an inverter. A reference sign 2 in the hybrid vehicle 1 shows a vehicle frame. In FIG. 1A, a part 3 above a vehicle floor is shown above the vehicle frame 2. A part 4 below the vehicle floor is shown below the vehicle frame 2. A wire harness 21 of the present invention is wired in the part 3 above the vehicle floor. The wire harness 21 is wired in a length of the front and rear direction of the vehicle including a vehicle compartment 5.

The wire harness 21 is connected to a plurality of devices 7 such as the inverter carried at the side of a vehicle front part 6. The wire harness 21 is connected to a high voltage battery 9 or a low voltage battery 10 which are carried at the side of a vehicle rear part 8. The wire harness 21 is connected to a DC to DC converter 11 which is carried at the side of the vehicle compartment 5. The wiring course in FIGS. 1A and 1B is an example.

The wire harness 21 includes an electric wire group 22 and a shielding protector 23. The shielding protector 23 is formed so that a shielding function (electromagnetic shielding function) can be demonstrated, while the electric wire group 22 can be accommodated separately for each voltage level. The shielding protector 23 of this embodiment includes an integrated shielding protector 24 which accounts for most of the shielding protector 23, and branch shielding protectors 25 and 26 which are connected to the integrated shielding protector 24.

The branch shielding protector 25 is included as a part corresponding to the electric wire group 22 connected to the high voltage battery 9. The branch shielding protector 26 is included as a part corresponding to the electric wire group 22 connected to the low voltage battery 10. The branch shielding protectors 25 and 26 are not particularly limited, but may be formed so that the integrated shielding protector 24 to be described below is extended.

The shielding protector 23 is grounded and fixed to the vehicle frame 2 via, for example, a bracket which has conductivity and which is not shown in the figure. (The shielding protector 23 is grounded and fixed to a part which may be grounded. While the shielding protector 23 is grounded by being directly contacted with the vehicle frame 2, the shielding protector 23 may be grounded and fixed to the vehicle frame 2, for example, with a clip. The fixing method shall not be particularly limited.)

Next, the composition, structure, and assembly of the wire harness 21 in the part of the integrated shielding protector 24 are described in detail with reference to FIGS. 2A and 2B.

In FIGS. 2A and 2B, the electric wire group 22 which forms the wire harness 21 has two first high voltage electric wires 27 as the first high voltage electrical pathways, a plurality of second high voltage electric wires 28 as the second high voltage electrical pathways whose voltage is lower than that of the first high voltage electric wires 27, and a plurality of low voltage electric wires 29 as the low voltage electrical pathways.

The above-mentioned first high voltage electric wires 27 are publicly known high voltage electric wires (288V), and include conductors and insulators (coverings). The conductor in this embodiment is manufactured of copper, copper alloy or aluminum. The conductor may be either a conductor structure in which wires are twisted or a rod-like conductor structure whose cross section is a rectangular shape or a round shape (for example, conductor structure with a rectangular single core or a round single core).

The above-mentioned second high voltage electric wires 28 are publicly known high voltage electric wires (42V), and include conductors and insulators (coverings). The conductor in this embodiment is manufactured of copper or copper alloy. A conductor structure in which wires are twisted is used for the conductor.

The low voltage electric wires 29 are publicly known insulative wire cores (12V), and include conductors and insulators (coverings) similarly to the second high voltage electric wires 28. The conductor is manufactured of copper or copper alloy. A conductor structure in which wires are twisted is used for the conductor.

A wiring course of the electric wire group 22 is formed when the two first high voltage electric wires 27, the plurality of second high voltage electric wires 28 and the plurality of low voltage electric wires 29 are packed for each voltage level.

The shielding protector 23 which forms the wire harness 21 includes the integrated shielding protector 24 as mentioned above, and the branch shielding protectors 25 and 26 (refer to FIG. 1B). The integrated shielding protector 24 is arranged in a position where the two first high voltage electric wires 27, the plurality of second high voltage electric wires 28 and the plurality of low voltage electric wires 29, which are packed for each voltage level, are wired in parallel in the same course. The integrated shielding protector 24 is formed as a component which has conductivity and which can demonstrate a shielding function.

The integrated shielding protector 24 has a first high voltage accommodating part 30, a second high voltage accommodating part 31, and a low voltage accommodating part 32 as accommodating parts for respectively accommodating the two first high voltage electric wires 27, the plurality of second high voltage electric wires 28 and the plurality of low voltage electric wires 29 which are packed for each voltage level. The integrated shielding protector 24 dividably includes a pair of divided shielding protectors 33 and 34, and a plurality of bolts 35 and nuts 36 (fixing member).

As shown in FIG. 2B, the pair of divided shielding protectors 33 and 34 are formed so that the pair of divided shielding protectors 33 and 34 can be fitted together by sandwiching the two first high voltage electric wires 27, the plurality of second high voltage electric wires 28 and the plurality of low voltage electric wires 29 which are packed for each voltage level, for example, in a vertical direction. The pair of divided shielding protectors 33 and 34 in a fitted state are formed by being fixed with the bolts 35 and the nuts 36. As long as the pair of divided shielding protectors 33 and 34 can be fitted together and fixed, other fixing members besides the bolts 35 and the nuts 36 may be used.

The pair of divided shielding protectors 33 and 34 are formed by forging a metal plate (for example, steel plate) which has conductivity in this embodiment. (The forming of the pair of divided shielding protectors 33 and 34 is not limited to this. For example, it is also possible to mold by using synthetic resin material which has conductivity, or to insertion mold with the above-mentioned metal plate and synthetic resin material which has conductivity.)

The first high voltage accommodating part 30, the second high voltage accommodating part 31 and the low voltage accommodating part 32 are accommodating parts provided for each voltage level, and are formed to be separated by connecting parts 37 between these accommodating parts. The connecting parts 37 used as partitions are formed so that the leakage of electromagnetic noise may not arise and there is a predetermined interval between the accommodating parts. The parts of reference signs 38 formed at the sides of the integrated shielding protector 24 show fixing flange parts which has through holes 39 where bolts are inserted. The fixing flange parts 38 are formed like the connecting parts 37 except the through holes 39 where bolts are inserted.

In the divided shielding protector 33, a reference sign 30a shows a part corresponding to the first high voltage accommodating part 30, a reference sign 31a shows a part corresponding to the second high voltage accommodating part 31, a reference sign 32a shows a part corresponding to the low voltage accommodating part 32, a reference sign 37a shows a part corresponding to the connecting part 37, and a reference sign 38a shows a part corresponding to the fixing flange part 38, respectively. In the divided shielding protector 34, a reference sign 30b shows a part corresponding to the first high voltage accommodating part 30, a reference sign 31b shows a part corresponding to the second high voltage accommodating part 31, a reference sign 32b shows a part corresponding to the low voltage accommodating part 32, a reference sign 37b shows a part corresponding to the connecting part 37, and a reference sign 38b shows a part corresponding to the fixing flange part 38, respectively.

The first high voltage accommodating part 30 is formed as an accommodating part which accommodates the two first high voltage electric wires 27. The second high voltage accommodating part 31 is formed as an accommodating part which accommodates the plurality of second high voltage electric wires 28. The low voltage accommodating part 32 is formed as an accommodating part which accommodates the plurality of low voltage electric wires 29. The first high voltage accommodating part 30 is formed to have a cross section of a generally ellipse shape. The second high voltage accommodating part 31 and the low voltage accommodating part 32 are formed to have a cross section of a circular shape.

The electric wire group 22 is adapted to be collectively accommodated by the above integrated shielding protector 24. That is, the two first high voltage electric wires 27 are not individually accommodated by an exclusive shielding protector, the plurality of second high voltage electric wires 28 are not individually accommodated by an exclusive shielding protector, and the plurality of low voltage electric wires 29 are not individually accommodated by an exclusive shielding protector. Therefore, an effect is achieved that the number of components can be reduced by including the integrated shielding protector 24, instead of the exclusive shielding protectors corresponding to each of the above electric wires. Further, an effect is achieved that the number of bolts and nuts for fixing can be reduced. Further, an effect is achieved that the connecting number of bolts and nuts can be reduced remarkably. In addition, an effect is achieved that the operability concerning the wiring of the wire harness 21 can be improved.

Embodiment 2

Figure 3A:
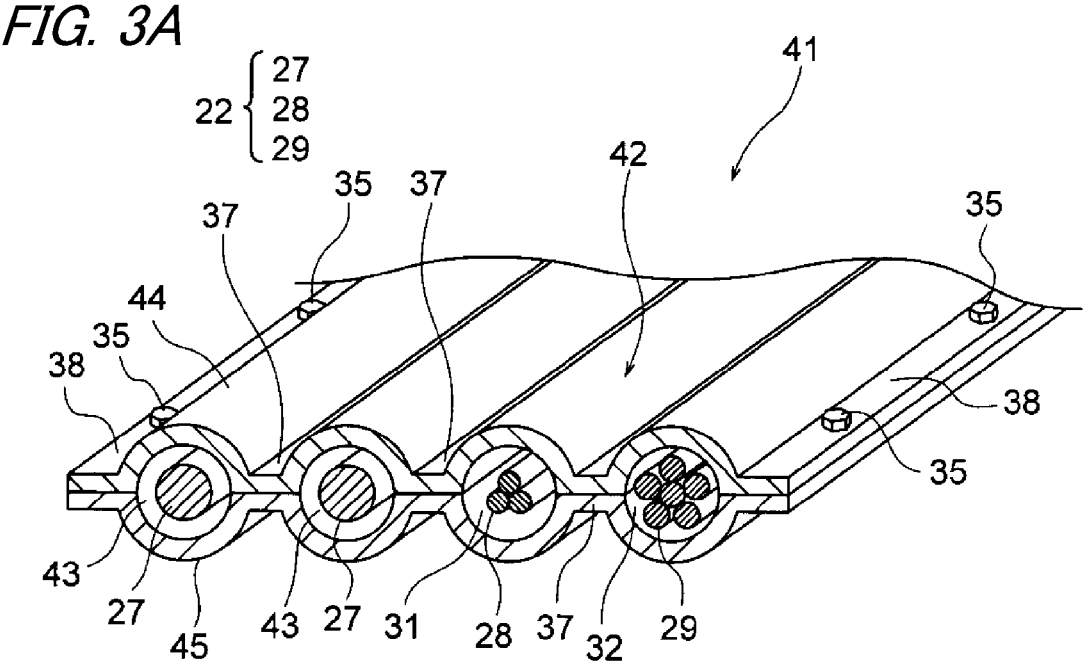
FIG. 3A is a perspective view which contains a part of a cross section of another example of wire harness.
Figure 3B:
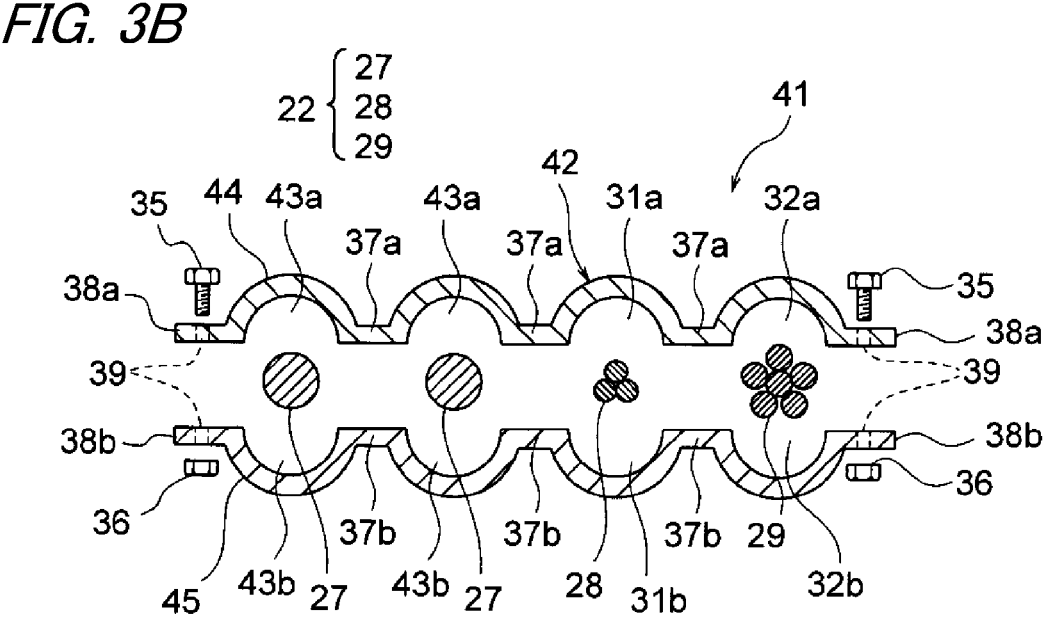
FIG. 3B is an exploded cross sectional view which shows the composition of the wire harness of FIG. 3A (an embodiment 2).

Next, an embodiment 2 is described with reference to the figures. FIG. 3A is a perspective view which contains a part of a cross section of another example of wire harness, and FIG. 3B is an exploded cross sectional view which shows the composition of the wire harness of FIG. 3A. Furthermore, the components that are identical with those in the above-mentioned embodiment 1 are given identical numbers, and their detailed description is omitted.

In FIGS. 3A and 3B, the wire harness 41 of the embodiment 2 differs in that an integrated shielding protector 42 is included instead of the integrated shielding protector 24 of the embodiment 1. Next, the integrated shielding protector 42 is described.

In the integrated shielding protector 42, two first high voltage accommodating parts 43 which have a circular cross section are formed by being paralleled so that two first high voltage electric wires 27 can be accommodated respectively. The two paralleled first high voltage accommodating parts 43 are separated by the connecting part 37. The integrated shielding protector 42 dividably includes a pair of divided shielding protectors 44 and 45, and a plurality of bolts 35 and nuts 36. Reference signs 43a and 43b show parts corresponding to the first high voltage accommodating parts 43. Other parts of the integrated shielding protector 42 than the above are formed similarly to the integrated shielding protector 24 of the embodiment 1.

The above integrated shielding protector 42 achieves an effect that a shielding function can be demonstrated for each one of the first high voltage electric wires 27, in addition to the same effects as the integrated shielding protector 24 of the embodiment 1. That is, an effect is achieved that the influence of electromagnetic noise from any one of the plurality of first high voltage electric wires 27 can be avoided.

Embodiment 3

Figure 4A:
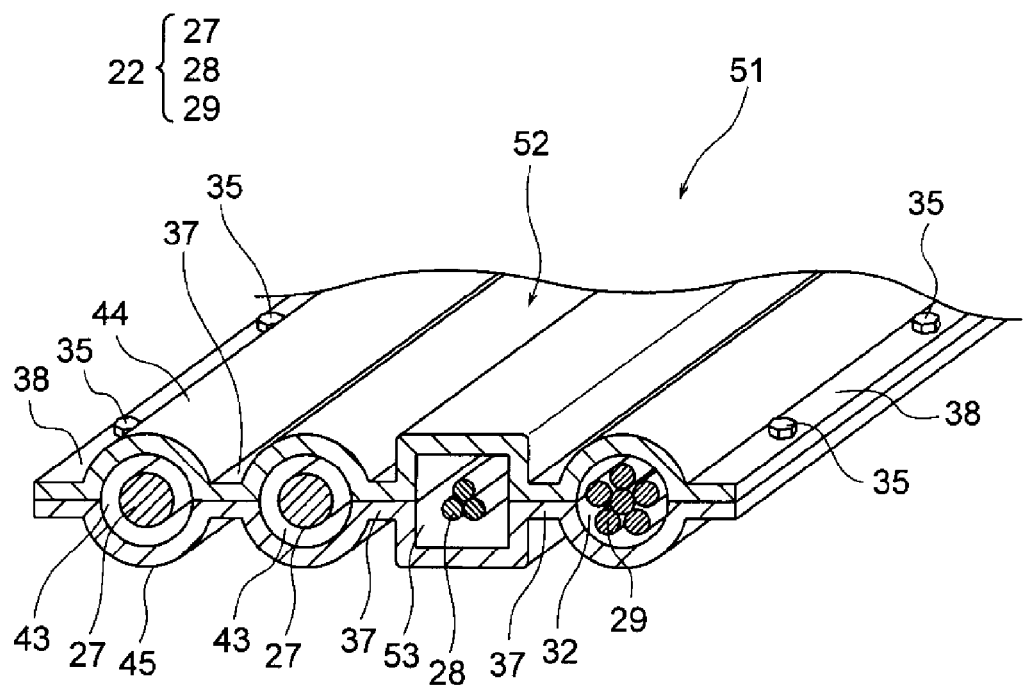
FIG. 4A is a perspective view which contains a part of a cross section of another example of wire harness.
Figure 4B:
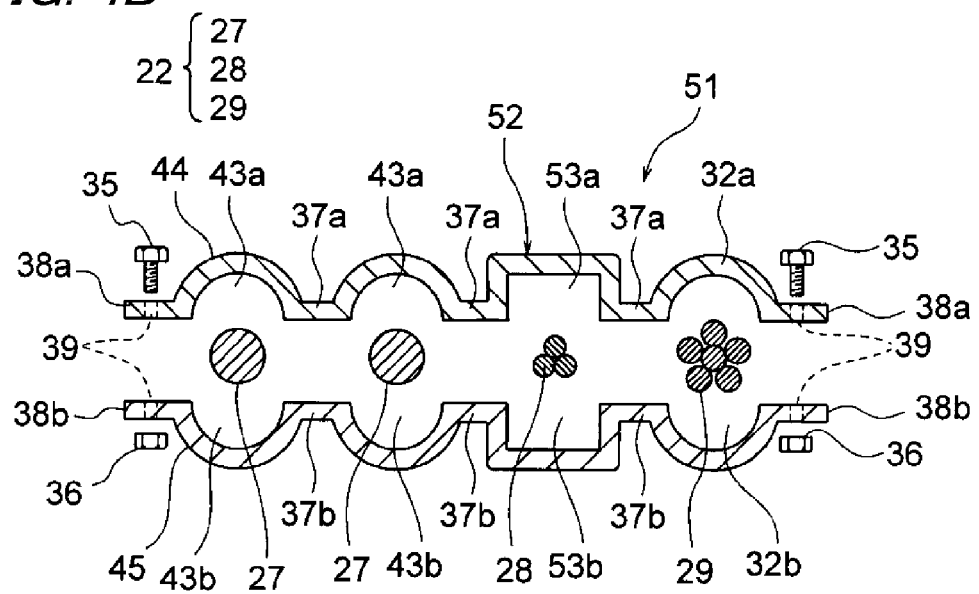
FIG. 4B is an exploded cross sectional view which shows the composition of the wire harness of FIG. 4A (an embodiment 3).

Next, an embodiment 3 is described with reference to the figures. FIG. 4A is a perspective view which contains a part of a cross section of another example of wire harness, and FIG. 4B is an exploded cross sectional view which shows the composition of the wire harness of FIG. 4A. Furthermore, the components that are identical with those in the above-mentioned embodiment 2 are given identical numbers, and their detailed description is omitted.

In FIGS. 4A and 4B, a wire harness 51 of the embodiment 3 differs in that the cross section of the second high voltage accommodating part 31 in the integrated shielding protector 42 of the embodiment 2 is changed to a rectangular shape. That is, the wire harness 51 differs in that an integrated shielding protector 52 is included. Next, the integrated shielding protector 52 is described.

The integrated shielding protector 52 has a second high voltage accommodating part 53 whose cross section is a rectangular shape. A plurality of second high voltage electric wires 28 are accommodated in the second high voltage accommodating part 53 whose cross section is a rectangular shape. Reference signs 53a and 53b show parts corresponding to the second high voltage accommodating part 53. Other parts of the integrated shielding protector 52 than the above are formed similarly to the integrated shielding protector 42 of the embodiment 2.

Although the second high voltage accommodating part 53 is formed to have a rectangular cross section in this embodiment, the embodiment is not limited to this but the first high voltage accommodating parts 43 may have a rectangular cross section. By making the shapes of the accommodating parts provided for each voltage level to be different, it becomes easy to identify.

The above integrated shielding protector 52 achieves an effect that the operability concerning the assembly can be improved, in addition to the same effects as the integrated shielding protector 42 of the embodiment 2.

Embodiment 4

Figure 5A:
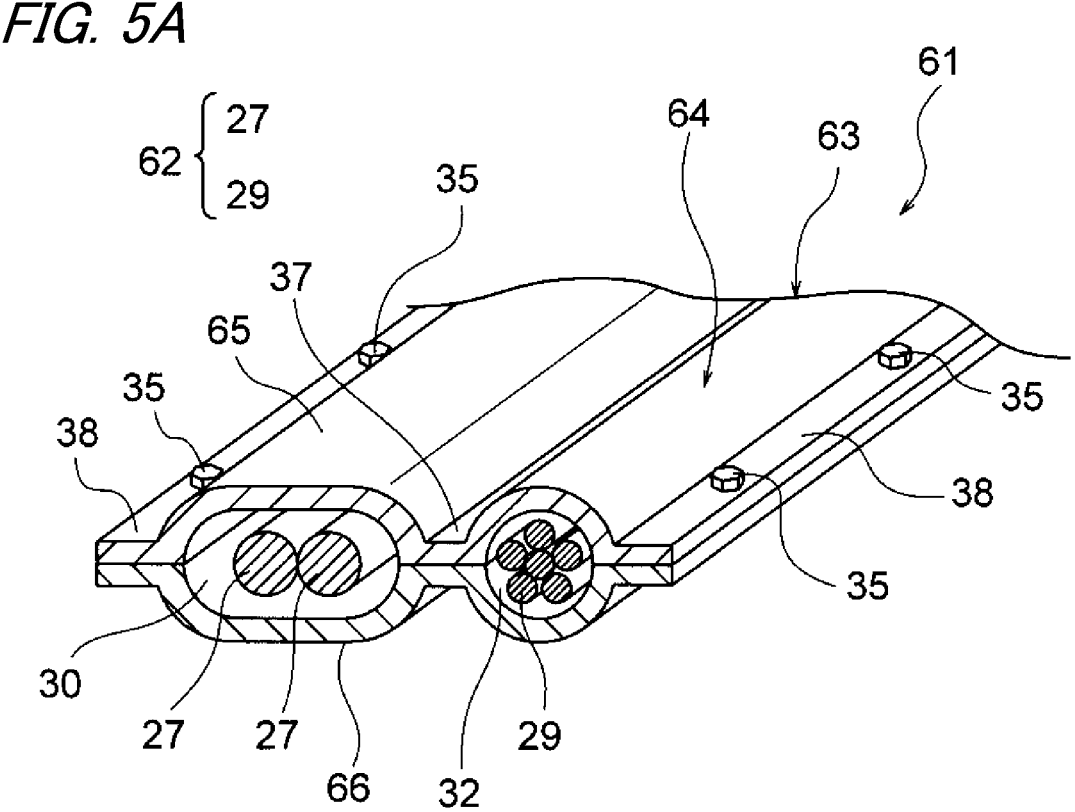
FIGS. 5A and 5B are perspective views which contain a part of a cross section of another example of wire harness (an embodiment 4).
Figure 5B:
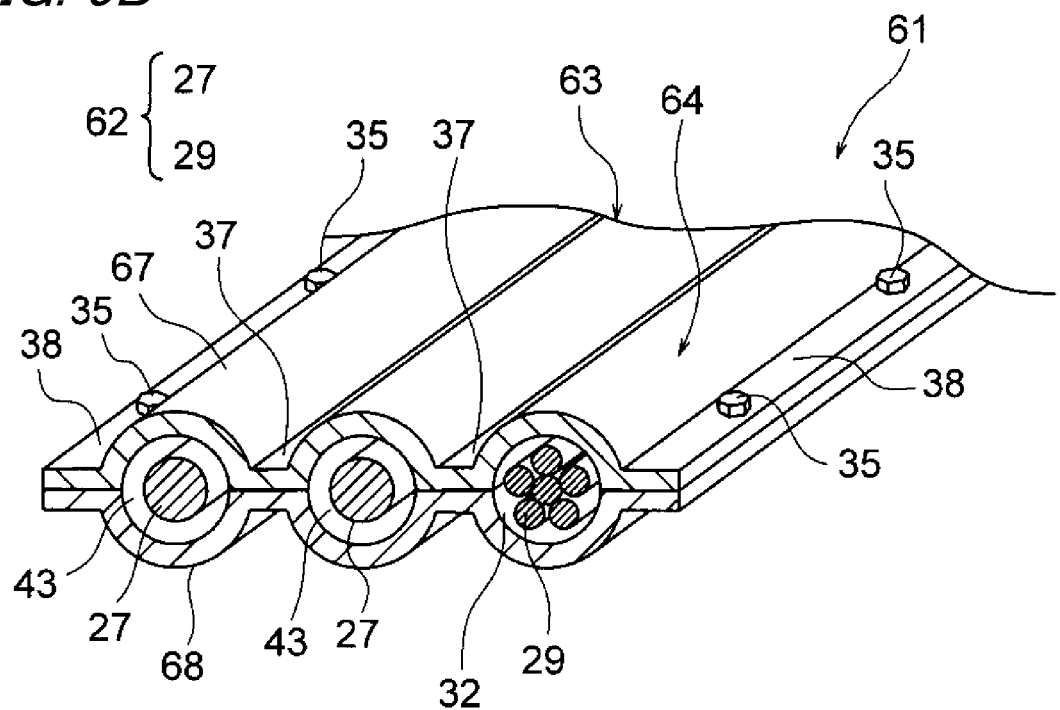

Next, an embodiment 4 is described with reference to the figures. FIGS. 5A and 5B are perspective views which contain a part of a cross section of another example of wire harness. Furthermore, the components that are identical with those in the above-mentioned embodiments 1 and 2 are given identical numbers, and their detailed description is omitted.

In FIGS. 5A and 5B, a wire harness 61 of the embodiment 4 includes an electric wire group 62 and a shielding protector 63. The shielding protector 63 is formed so that a shielding function (electromagnetic shielding function) can be demonstrated, while the electric wire group 62 can be accommodated separately for each voltage level. The shielding protector 63 of this embodiment includes an integrated shielding protector 64 which accounts for most of the shielding protector 63, and branch shielding protectors which are not shown in the figure and which are connected to the integrated shielding protector 64.

Next, the composition, structure, assembly of the wire harness 61 in the part of the integrated shielding protector 64 are described in detail.

The electric wire group 62 which forms the wire harness 61 has two first high voltage electric wires 27 and a plurality of low voltage electric wires 29. A wiring course of the electric wire group 62 is formed when the two first high voltage electric wires 27 and the plurality of low voltage electric wires 29 are packed for each voltage level.

The integrated shielding protector 64 in the shielding protector 63 is arranged in a position where the two first high voltage electric wires 27 and the plurality of low voltage electric wires 29, which are packed for each voltage level, are wired in parallel in the same course. The integrated shielding protector 64 is formed as a component which has conductivity and which can demonstrate a shielding function.

In the case of FIG. 5A, the integrated shielding protector 64 has a first high voltage accommodating part 30 and a low voltage accommodating part 32 as accommodating parts for respectively accommodating the two first high voltage electric wires 27 and the plurality of low voltage electric wires 29 which are packed for each voltage level. In the case of FIG. 5A, the integrated shielding protector 64 dividably includes a pair of divided shielding protectors 65 and 66, and a plurality of bolts 35 and nuts 36 (fixing member).

On the other hand, in the case of FIG. 5B, the integrated shielding protector 64 has two paralleled first high voltage accommodating parts 43 and a low voltage accommodating part 32. In the case of FIG. 5B, the integrated shielding protector 64 dividably includes a pair of divided shielding protectors 67 and 68, and a plurality of bolts 35 and nuts 36 (fixing member).

The pair of divided shielding protectors 65 and 66 (67 and 68) are formed so that the pair of divided shielding protectors 65 and 66 (67 and 68) can be fitted together by sandwiching the two first high voltage electric wires 27 and the plurality of low voltage electric wires 29 which are packed for each voltage level, for example, in a vertical direction. The pair of divided shielding protectors 65 and 66 (67 and 68) in a fitted state are formed by being fixed with the bolts 35 and the nuts 36.

The pair of divided shielding protectors 65 and 66 (67 and 68) are formed by forging a metal plate (for example, steel plate) which has conductivity in this embodiment. (The forming of the pair of divided shielding protectors 65 and 66 (67 and 68) is not limited to this. For example, it is also possible to mold by using synthetic resin material which has conductivity, or to insertion mold with the above-mentioned metal plate and synthetic resin material which has conductivity.)

The first high voltage accommodating part 30 and the low voltage accommodating part 32 (the first high voltage accommodating parts 43 and the low voltage accommodating part 32) are accommodating parts provided for each voltage level, and are formed to be separated by connecting parts 37 between these accommodating parts. The connecting parts 37 used as partitions are formed so that the leakage of electromagnetic noise may not arise and there is a predetermined interval between the accommodating parts.

The electric wire group 62 is adapted to be collectively accommodated by the above integrated shielding protector 64. That is, the two first high voltage electric wires 27 are not individually accommodated by an exclusive shielding protector, and the plurality of low voltage electric wires 29 are not individually accommodated by an exclusive shielding protector. Therefore, an effect is achieved that the number of components can be reduced by including the integrated shielding protector 64, instead of the exclusive shielding protectors corresponding to each of the above electric wires. Further, an effect is achieved that the number of bolts and nuts for fixing can be reduced. Further, an effect is achieved that the connecting number of bolts and nuts can be reduced remarkably. In addition, an effect is achieved that the operability concerning the wiring of the wire harness 61 can be improved.

Embodiment 5

Figure 6A:
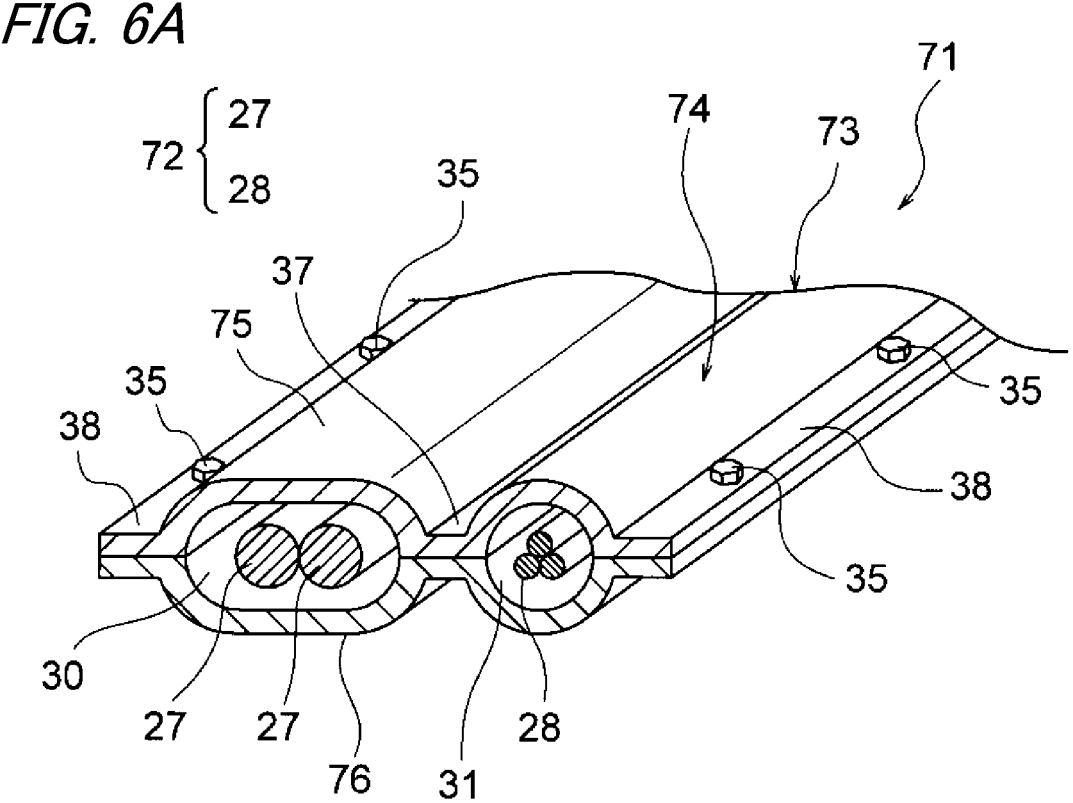
FIGS. 6A and 6B are perspective views which contain a part of a cross section of another example of wire harness (an embodiment 5).
Figure 6B:
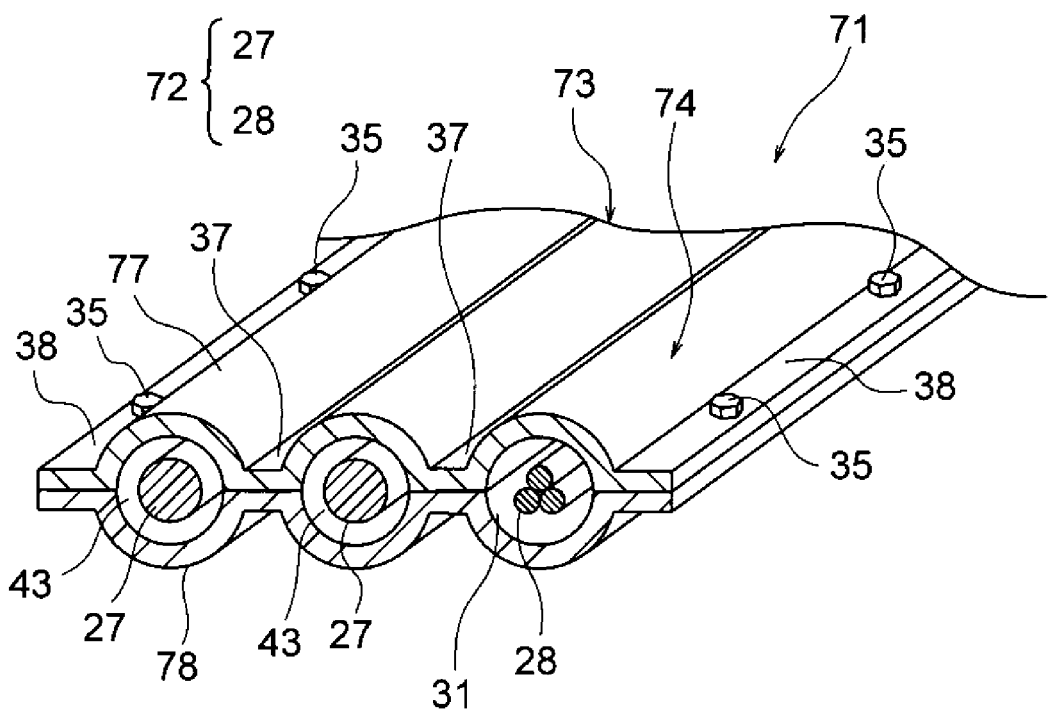

Next, an embodiment 5 is described with reference to the figures. FIGS. 6A and 6B are perspective views which contain a part of a cross section of another example of wire harness. Furthermore, the components that are identical with those in the above-mentioned embodiments 1 and 2 are given identical numbers, and their detailed description is omitted.

In FIGS. 6A and 6B, a wire harness 71 of the embodiment 5 includes an electric wire group 72 and a shielding protector 73. The shielding protector 73 is formed so that a shielding function (electromagnetic shielding function) can be demonstrated, while the electric wire group 72 can be accommodated separately for each voltage level. The shielding protector 73 of this embodiment includes an integrated shielding protector 74 which accounts for most of the shielding protector 73, and branch shielding protectors which are not shown in the figure and which are connected to the integrated shielding protector 74.

Next, the composition, structure, assembly of the wire harness 71 in the part of the integrated shielding protector 74 are described in detail.

The electric wire group 72 which forms the wire harness 71 has two first high voltage electric wires 27 and a plurality of second high voltage electric wires 28. A wiring course of the electric wire group 72 is formed when the two first high voltage electric wires 27 and the plurality of second high voltage electric wires 28 are packed for each voltage level.

The integrated shielding protector 74 in the shielding protector 73 is arranged in a position where the two first high voltage electric wires 27 and the plurality of second high voltage electric wires 28, which are packed for each voltage level, are wired in parallel in the same course. The integrated shielding protector 74 is formed as a component which has conductivity and which can demonstrate a shielding function.

In the case of FIG. 6A, the integrated shielding protector 74 has a first high voltage accommodating part 30 and a second high voltage accommodating part 31 as accommodating parts for respectively accommodating the two first high voltage electric wires 27 and the plurality of second high voltage electric wires 28 which are packed for each voltage level. In the case of FIG. 6A, the integrated shielding protector 74 dividably includes a pair of divided shielding protectors 75 and 76, and a plurality of bolts 35 and nuts 36 (fixing member).

On the other hand, in the case of FIG. 6B, the integrated shielding protector 74 has two paralleled first high voltage accommodating parts 43 and a second high voltage accommodating part 31. In the case of FIG. 6B, the integrated shielding protector 74 dividably includes a pair of divided shielding protectors 77 and 78, and a plurality of bolts 35 and nuts 36 (fixing member).

The pair of divided shielding protectors 75 and 76 (77 and 78) are formed so that the pair of divided shielding protectors 75 and 76 (77 and 78) can be fitted together by sandwiching the two first high voltage electric wires 27 and the plurality of second high voltage electric wires 28 which are packed for each voltage level, for example, in a vertical direction. The pair of divided shielding protectors 75 and 76 (77 and 78) in a fitted state are formed by being fixed with the bolts 35 and the nuts 36.

The pair of divided shielding protectors 75 and 76 (77 and 78) are formed by forging a metal plate (for example, steel plate) which has conductivity in this embodiment. (The forming of the pair of divided shielding protectors 75 and 76 (77 and 78) is not limited to this. For example, it is also possible to mold by using synthetic resin material which has conductivity, or to insertion mold with the above-mentioned metal plate and synthetic resin material which has conductivity.)

The first high voltage accommodating part 30 and the second high voltage accommodating part 31 (the first high voltage accommodating parts 43 and the second high voltage accommodating part 31) are accommodating parts provided for each voltage level, and are formed to be separated by connecting parts 37 between these accommodating parts. The connecting parts 37 used as partitions are formed so that the leakage of electromagnetic noise may not arise and there is a predetermined interval between the accommodating parts.

The electric wire group 72 is adapted to be collectively accommodated by the above integrated shielding protector 74. That is, the two first high voltage electric wires 27 are not individually accommodated by an exclusive shielding protector, and the plurality of second high voltage electric wires 28 are not individually accommodated by an exclusive shielding protector. Therefore, an effect is achieved that the number of components can be reduced by including the integrated shielding protector 74, instead of the exclusive shielding protectors corresponding to each of the above electric wires. Further, an effect is achieved that the number of bolts and nuts for fixing can be reduced. Further, an effect is achieved that the connecting number of bolts and nuts can be reduced remarkably. In addition, an effect is achieved that the operability concerning the wiring of the wire harness 71 can be improved.

The integrated shielding protectors and the wire harnesses of the present invention are described in detail with reference to the specific embodiments, but the invention is not limited to the previously described embodiments, and besides, it is apparent that various modifications can be made without changing the purpose of the invention.

This application is based on the Japanese patent application (patent application 2010-138911) filed on Jun. 18, 2010, whose content is incorporated herein by reference.

INDUSTRIAL APPLICABILITY

According to the integrated shielding protectors and the wire harnesses of the invention, the number of components can be reduced while the man-hours concerning the wiring operation can be reduced.

REFERENCE SIGNS LIST

1—hybrid vehicle
2—vehicle frame
3—part above the vehicle floor
4—part below the vehicle floor
5—vehicle compartment
6—vehicle front part
7—device
8—vehicle rear part
9—high voltage battery
10—low voltage battery
11—DC to DC converter
21—wire harness
22—electric wire group
23—shielding protector
24—integrated shielding protector
25 and 26—branch shielding protector
27—first high voltage electric wire (first high voltage electrical pathway)
28—second high voltage electric wire (the second high voltage electrical pathway)
29—low voltage electric wire (low voltage electrical pathway)
30—first high voltage accommodating part
31—second high voltage accommodating part
32—low voltage accommodating part
33 and 34—divided shielding protector
35—bolt (fixing member)
36—nut (fixing member)
37—connecting part
38—fixing flange part
39—through hole where a bolt is inserted
41—wire harness
42—integrated shielding protector
43—first high voltage accommodating part
44 and 45—divided shielding protector
51—wire harness
52—integrated shielding protector
53—second high voltage accommodating part
61—wire harness
62—electric wire group
63—shielding protector
64—integrated shielding protector
65 to 68—divided shielding protector
71—wire harness
72—electric wire group
73—shielding protector
74—integrated shielding protector
75 to 78—divided shielding protector

The invention claimed is:

1. An integrated shielding protector, arranged at a position where a first high voltage electrical pathway the voltage of which is high and at least one of a second high voltage electrical pathway the voltage of which is high but lower than that of the first high voltage electrical pathway and a low voltage electrical pathway the voltage of which is low are wired in parallel in the same course,
   formed of material having conductivity, and
   divided for each voltage level and formed to integrally have at least one of a second high voltage accommodating part which accommodates the second high voltage electrical pathway and a low voltage accommodating part which accommodates the low voltage electrical pathway, and a first high voltage accommodating part which accommodates the first high voltage electrical pathway,
   wherein the first high voltage accommodating part and the second high voltage accommodating part are formed to have different cross-sectional shapes from each other,
   wherein a cross-section of one of the first high voltage accommodating part and the second high voltage accommodating part is a circle and a cross-section of another of the first high voltage accommodating part and the second high voltage accommodating part a rectangle.

2. The integrated shielding protector according to claim 1, wherein
   as accommodating parts corresponding to a plurality of the first high voltage electrical pathways, a plurality of the first high voltage accommodating parts, the number of which corresponds to the number of the first high voltage electrical pathways, are formed in parallel.

3. The integrated shielding protector according to claim 1, comprising
   a pair of divided shielding protectors and fixing members adapted to fix the pair of divided shielding protectors to be fitted together.

4. A wire harness comprising an integrated shielding protector, the integrated shielding protector being arranged at a position where a first high voltage electrical pathway the voltage of which is high and at least one of a second high voltage electrical pathway the voltage of which is high but lower than that of the first high voltage electrical pathway and a low voltage electrical pathway the voltage of which is low are wired in parallel in the same course by the integrated shielding protector,
   wherein the integrated shielding protector is formed of material having conductivity, and
   wherein the integrated shielding protector is divided for each voltage level and formed to integrally have at least one of a second high voltage accommodating part which accommodates the second high voltage electrical pathway and a low voltage accommodating part which accommodates the low voltage electrical pathway, and a first high voltage accommodating part which accommodates the first high voltage electrical pathway, and
   wherein the first high voltage accommodating part and the second high voltage accommodating part are formed to have different cross-sectional shapes from each other,
   wherein a cross-section of one of the first high voltage accommodating art and the second high voltage accommodating part is a circle and a cross-section of another of the first high voltage accommodating part and the second high voltage accommodating part is a rectangle.

5. The wire harness comprising the integrated shielding protector according to claim 4, wherein the integrated shielding protector further comprises a pair of divided shielding protectors and fixing members adapted to fix the pair of divided shielding protectors to be fitted together.

6. The wire harness according to claim 4, further comprising
   conductive branch shielding protectors which are connected with the integrated shielding protector.

7. The wire harness according to claim 5, further comprising
   conductive branch shielding protectors which are connected with the integrated shielding protector.

8. An integrated shielding protector for wiring a plurality of different voltage electrical pathways, the integrated shielding protector comprising:
   a first shielding protector part and an opposing second shielding protector part, the first shielding protector part and the second shielding protector part having corresponding accommodating parts, which form a first accommodating portion and a second accommodating portion when the first shielding protector part and the second shielding protector part are affixed to one another;
   wherein the first accommodating portion is configured to accept an electrical pathway of a first voltage and the second accommodating portion is configured to accept an electrical pathway of a second, different voltage,
   wherein the integrated shielding protector comprises a conductive material, and wherein the first accommodating portion and the second accommodating portion are formed to have different cross-sectional shapes from each other,
   wherein a cross-section of one of the first accommodating portion and the second accommodating portion is a circle and a cross-section of another of the first accommodating portion and the second accommodating portion is a rectangle.

9. The integrated shielding protector of claim 8, wherein the first shielding protector part and the second shielding protector part are affixed to one another by fastening means including bolts and nuts.

10. The integrated shielding protector of claim 8, wherein the integrated shielding protector comprises a conductive synthetic resin material.

11. The integrated shielding protector of claim 8,
    wherein the first shielding protector part and the second shielding protector part further comprise a third accommodating portion, the third accommodating portion is configured to accept an electrical pathway of a third voltage, different from the first and the second voltage,
    wherein the integrated shielding protector is configured to prevent electromagnetic noise generated from a high voltage first electrical pathway from influencing the electrical pathways of the second and third voltages.

12. The integrated shielding protector according to claim 1, wherein the low voltage accommodating part is adapted to accommodate a plurality of the low voltage electrical pathways.

13. The integrated shielding protector according to claim 1, wherein the second high voltage accommodating portion is adapted to accommodate a plurality of second high voltage electrical pathways.

* * * * *